UNITED STATES PATENT OFFICE.

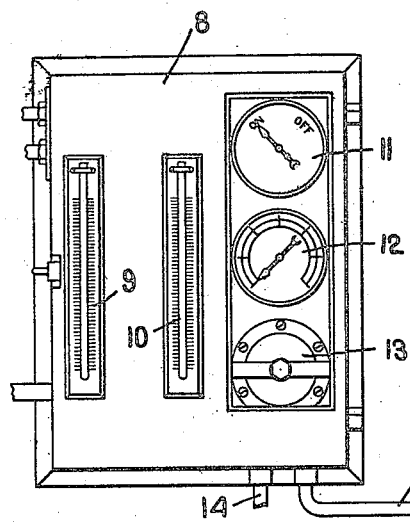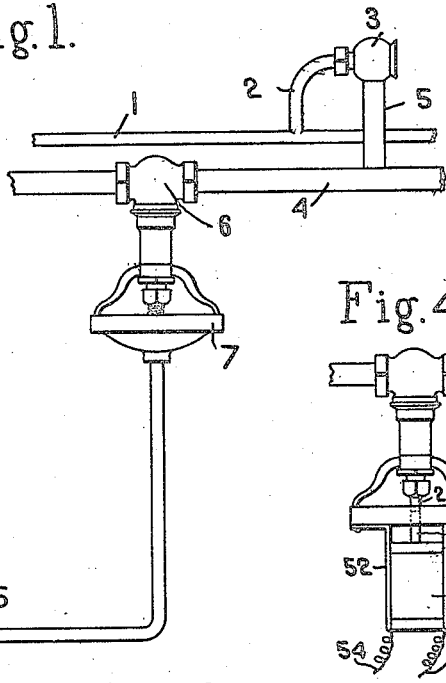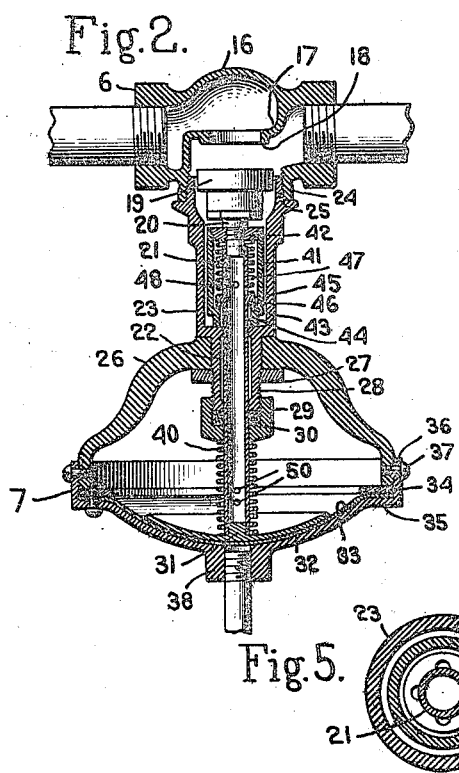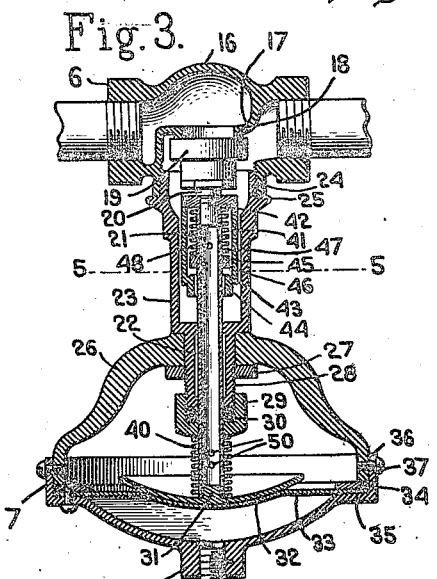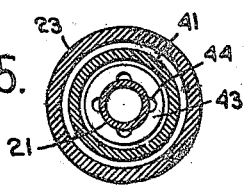

ALBERT W. THOMPSON, OF FITCHBURG, AND EDWARD W. COMFORT, OF WINCHESTER, MASSACHUSETTS, ASSIGNORS TO THE G. M. PARKS COMPANY, OF FITCHBURG, MASSACHUSETTS, A CORPORATION OF MASSACHUSETTS.

HUMIDIFIER.

1,265,550.   Specification of Letters Patent.   Patented May 7, 1918.

Application filed April 5, 1916. Serial No. 88,986.

*To all whom it may concern:*

Be it known that we, ALBERT W. THOMPSON and EDWARD W. COMFORT, citizens of the United States, and residents of Fitchburg, county of Worcester, State of Massachusetts, and Winchester, county of Middlesex, State of Massachusetts, have invented an Improvement in Humidifiers, of which the following description, in connection with the accompanying drawing, is a specification, like characters on the drawing representing like parts.

This invention relates to improvements in humidifiers which comprise a water vaporizing instrumentality and means for supplying a gaseous fluid under pressure thereto to cause the atomization or vaporization of the water and its distribution throughout the inclosure in which it is desired to increase the humidity of the atmosphere.

The present invention is shown in a humidifying apparatus comprising a water supply pipe having one or more atomizing heads preferably of the "turbo" type disclosed in the prior patent to Albert W. Thompson, No. 869,945, granted Nov. 5, 1907, and a conduit for supplying a gaseous fluid under pressure such as compressed air to said vaporizers to atomize or vaporize the water. In such apparatus it is desirable to provide means for automatically regulating the supply of moisture to the air in order that the room may be maintained at a constant predetermined degree of relative humidity. This has been accomplished by providing automatically operable valves for controlling the supply of compressed air in the conduits leading to the vaporizing heads, the controlling apparatus being so devised as to shut off the supply of compressed air when the desired degree of relative humidity is attained and automatically to open the valve when the humidity falls below a predetermined degree.

In operation these automatically controlled valves are closed quickly when the relative humidity falls below a predetermined amount but there is a residual pressure in the portion of the conduit intermediate of the valves and the atomizing heads which becomes reduced gradually so that the heads discharge a coarse vapor or drip. In mills and factories the humidifying systems are usually installed overhead and the frequent operations of the automatic controlling device when the same is set to regulate the relative humidity within narrow limits are likely to cause a sufficient dripping to injure the machines and goods located beneath the vaporizing heads.

The principal object of the present invention is to provide means whereby the vaporizing heads will be rendered inoperative immediately upon the actuation of the controlling valve and the undesirable dripping prevented. This is accomplished in the preferred form of the invention embodied herein by providing means for venting automatically the section of pipe between the valve and the vaporizing head immediately upon the shutting off of the supply of compressed air to the vaporizing head or heads.

In textile mills and in many other places the atmosphere of the mill is laden with more or less lint and dust so that it is difficult to prevent valves of the character above described from becoming clogged and ineffective.

Another object of the invention is to provide a compound valve in which both the main valve and the supplementary valve which controls the vent opening from the conduit leading to the vaporizer will be entirely inclosed and which will be self cleaning.

Other objects of the invention will more fully appear from the following description, the accompanying drawings, and will be pointed out particularly in the annexed claims.

The drawings illustrate a portion of a humidifying system with means for automatically controlling the same, embodying also means for rendering the atomizing heads inoperative quickly upon the shutting off of the supply of gaseous fluid under pressure.

In the drawings;

Figure 1 is a view of a section of the water supply pipe conduit for the gaseous fluid under pressure showing an atomizing head operatively connected to said conduit and a regulating valve for controlling the supply of gaseous fluid under pressure with automatic regulating means for controlling the operation of said valve.

Fig. 2 is a vertical sectional view of a controlling valve embodying the preferred form of our invention, said valve being actuated by a motor operated by fluid under pressure, showing the main valve in open positoin.

Fig. 3 is a similar view showing a main valve in closed position and,

Fig. 4 is a detail view showing a similar valve actuated by an electric motor.

Fig. 5 is a detail horizontal sectional view through the valve stem casing and auxiliary valve.

The humidifying system illustrated in the accompanying drawing comprises a water supply pipe 1 having one or more vertical branches 2 leading to and supporting atomizing heads 3 preferably of the "turbo" type such as disclosed in the patent to Albert W. Thompson, No. 869,945, above mentioned and a compressed air pipe 4 having a branch or branches 5 leading to said atomizing heads 3, and the supply of fluid under pressure in the conduit is controlled by a valve 6 which is automatically actuated by a motor 7 which may be a fluid pressure motor, an electric motor, or other suitable device which in turn is controlled by a suitable humidity controlling apparatus, the preferred form of controlling device conventionally illustrated herein being of the type disclosed in our prior application Ser. No. 60,804, filed Nov. 10, 1915 which comprises a plurality of differentially expansible members, one of which is exposed to the temperature of the air of the room and the other of which is maintained at the psychrometric wet bulb temperature of said air.

The regulating apparatus shown herein illustrates merely the outside of the casing 8 with the wet and dry bulb thermometers 9 and 10 and the dials 11 and 12 indicating respectively the operative position of the controlling apparatus and the pressure of the fluid and a partial view of the relay valve 13 of the regulator together with the pipes 14, 15 leading respectively to the relay valve 13 and from the relay valve chamber of the diaphragm motor 7.

In the operation of the device as disclosed in the prior application above mentioned a gaseous fluid under pressure is supplied through a conduit beneath the diaphragm 7 thus maintaining the main valve 6 in closed position. When the relative humidity falls below the predetermined amount the differential expansion of the wet and dry bulb members of the controlling apparatus causes the release of the pressure in the pipe 15 leading to the chamber beneath the diaphragm of the motor 7 thus permitting the main valve in the conduit 6 to be opened by a suitable spring thus supplying fluid under pressure through the short pipe 5 to the humidified head, or heads 3, causing the same to become active and to supply additional moisture to the room. When the air of the room is charged with moisture to the predetermined amount the relative movement of the wet and dry bulb members of the controlling device causes the reinstatement of pressure in the pipe 15 thus closing the valve 6 in the manner above described and shutting off the supply of compressed air from the conduit 4 to the humidifier heads.

In practice a single valve such as the valve 6, may serve to control one or a number of humidifier heads, the valve being located at a considerable distance from one or more of said heads.

In the usual operation of the apparatus the residual pressure of the compressed air contained in the conduit and its branches between the valve and the humidifier head or heads gradually decreases causing a coarser and coarser spray and finally terminating in a drip so that the coarse spray and dripping from the humidifier heads is likely to injure machinery or to cause undesirable wet spots upon the floor of the building as above described. The present invention comprises the introduction into the conduit for supplying fluid under pressure of a valve adapted not only to shut off the supply of compressed air but immediately thereafter to vent or release the fluid under pressure in the section of the conduit intermediate of the valve and the humidifier heads so that the latter will instantly become inoperative and not discharge a coarse spray or drip in the manner above described.

Various valves having means to close and open the passage through the conduit 4 and having venting means leading from the portion of the conduit intermediate of the valve and humidifier heads may be employed and it is to be understood that our invention embraces broadly any means which may be utilized to serve this purpose.

A convenient form of valve, especially adapted for this work as illustrated in Figs. 2 and 3 comprises a valve casing 16 of the "globe" type having a transverse partition 17 provided with a valve seat 18.

The valve head 19 which coöperates with the valve seat 18 preferably is provided with an integral stud 20 upon which a tubular valve stem 21 is slidably mounted for purposes which will hereinafter be more fully set forth.

The valve stem 21 is reciprocably mounted in a stuffing box 22 which forms an extension of a hollow preferably cylindrical valve stem casing 23 which is secured to the valve casing 16 by screw threaded connections 24 and 25.

The stuffing box 22 preferably constitutes a cylindrical extension of the valve stem casing 23 and provides a seat for a bracket 26 adapted to support a diaphragm motor, the bracket 26 being secured upon said stuffing box by a nut 27 engaging exterior screw threads 28 upon the stuffing box. A nut 29 screwed upon the end of the stuffing box serves to retain suitable packing 30 closely against the valve stem so that the leakage of air therethrough is prevented. The valve stem 21 is connected at its outer end to a boss 31 projecting centrally from the concaved face of a curved plate 32 which engages a flexible diaphragm 33 which is clamped by a ring 34 upon a cup shaped casing 35, said casing 35 being provided with a flange 36 secured by screws 37 or other fastenings to the lower ends of the bracket 26. The casing 35 is provided with an internally screw threaded boss 38 to which the pipe 15 leading from the humidifier controller is connected.

In the operation of the device the introduction of fluid under pressure in the pipe 15 will raise the diaphragm 33 thereby forcing the valve stem forward and causing the valve head 19 to engage the valve seat 18 and thereby shut off the supply of air in the conduit in the manner which is heretofore described. A helical spring 40 seated at one end against the nut 29 and at the opposite end against the inner face of the plate 32 serves to maintain the main valve in open position when the fluid pressure in the pipe 15 is released.

The auxiliary valve which serves to release the residual pressure from the section of the conduit 4 intermediate of the valve and the humidifier heads is inclosed within the valve stem casing and thus is protected from injury and from becoming clogged with lint, dust and other impurities. This valve comprises a sleeve 41 having an internal screw threaded upper end engaging external screw threads upon a nut 42 which is screwed upon the stud 20 of the valve head 19. The opposite end of the sleeve 41 is contracted to form a preferably annular valve seat 43 the extension beyond said valve seat being provided with vertical grooves 44 forming air passages leading from the chamber within the valve stem casing into the chamber of the sleeve 41.

The tubular valve stem 21 is provided with an annular flange or collar 45 forming a valve adapted to coöperate with the valve seat 43. A suitable washer 46 of fibrous material may be secured to the face of the annular flange or valve 45 to hermetically close the openings 44 when the valve 45 is seated. A helical spring 47 bearing at one end upon the valve 45 and at the opposite end against the nut 42 serves normally to hold the valve 19 in extended position and the auxiliary valve closed, the main valve at this time being retained in open position by the spring 40, as illustrated in Fig. 2.

Under these conditions the fluid under pressure is supplied through the main conduit 4 and branch conduits 5 to the humidifier heads which are thereby rendered operative.

When the predetermined degree of relative humidity of the atmospere of the room is attained the relative movement of the controller members (not shown) causes the introduction into the pipe 15 of a sufficient amount of fluid under pressure to raise the diaphragm 33, thus forcing the tubular valve stem inwardly until the valve 19 engages the valve seat 18. Upon further movement of the hollow valve stem 21 by virtue of the pressure beneath the diaphragm the annular collar or valve 45 is raised from its seat 43 against the pressure of the spring 47 thus permitting the fluid under pressure which is in the chamber of the valve stem casing, the outlet portion of the main valve, and the portion of the conduit 4 between the valve and the humidifier heads to escape through the apertures 44 into the chamber of the sleeve 41 and from said chamber, through the apertures 48, into the hollow valve stem from which it issues to the atmosphere through the apertures 50. When the pressure in the pipe 15 is released the spring 40 causes the outward movement or withdrawal of the valve stem until the valve 45 again reaches the seat 43, the valve 19 meanwhile being retained in closed position by the action of the spring 47.

Upon further movement of the valve stem under the influence of the spring 40 the valve head 19 is withdrawn from engagement with the valve seat 18 and communication through the conduit 4 again established.

While it is ordinarily desirable to seat the valve 19, thus shutting off the supply of fluid under pressure, then to release the residual pressure in the line leading to the humidifier heads, other conditions may be readily provided by substituting springs 47 of different strengths, for example a spring 47 may be utilized which will be so balanced as to release the residual pressure simultaneously with the shutting of the valve 19. Or substituting a weaker spring 47, the compression of said spring may be effected as the valve 19 approaches its seat against the force of the fluid under pressure flowing through the conduit so that the supplemental or relief valve 45 will be unseated before the valve 19 has reached its seat. By this means the action of the humidifier heads may be arrested more quickly. It is thus possible to cause the operation of the valves 19 and 45 simultaneously or in any predetermined succession.

It will be readily understood that other forms of motor for actuating the valve stem 21 may be substituted as for example an electric motor such as is illustrated in Fig. 4 which comprises a solenoid 51 carried in a frame 52 depending from the brackets 13

26, the core 53 of the solenoid being operatively connected to the hollow valve stem 21.

The operation of the solenoid may be controlled through any suitable thermostatic, hygrometric, or psychrometric controlling device adapted to control the current in the conduits 54, 55 of the solenoid.

It is to be understood that this invention is illustrative and not restrictive and that the embodiment herein shown may be constructed in other forms within the spirit and scope of the following claims.

Having thus described our invention what we claim as new and desire to secure by Letters Patent is:

1. In a humidifying system a water vaporizing instrumentality having means including a conduit for supplying a gaseous fluid under pressure thereto, means for automatically controlling the flow of gaseous fluid in said conduit including a motor controlled valve having mechanism operable in a predetermined succession to shut off the supply of gaseous fluid and to vent the section of the conduit intermediate of said valve and said vaporizing instrumentality whereby the latter will be rendered inoperative quickly.

2. In a humidifying system, a water vaporizing instrumentality having means including a conduit for supplying a gaseous fluid under pressure thereto; means for controlling the flow of gaseous fluid in said conduit including a pneumatic diaphragm motor for actuating the same, a main valve, said valve having mechanism operable successively to shut off the supply of gaseous fluid in said conduit and vent the section of the conduit intermediate of said valve and said vaporizing instrumentality.

3. In a humidifying system, a water vaporizing instrumentality having means including a conduit for supplying a gaseous fluid under pressure thereto; an automatically operable compound valve in said conduit consisting of a main valve adapted to shut off the supply of gaseous fluid and an auxiliary valve operably connected to the main valve and adapted upon the closing of the main valve to vent the section of the conduit intermediate of said main valve and said instrumentality.

4. In a humidifying system, a water vaporizing instrumentality having means including a conduit for supplying a gaseous fluid under pressure thereto; a compound valve in said conduit comprising a main valve casing having a partition dividing the same into inlet and outlet chambers, a hollow valve casing connected to and communicating with said outlet chamber, a main valve having a stem reciprocably mounted in said valve stem casing and a supplementary valve in said valve stem casing adapted upon the closing of said main valve to vent the outlet chamber of said valve casing and the portion of the conduit connected thereto.

5. In a humidifying system, a water vaporizing instrumentality having means including a conduit for supplying a gaseous fluid under pressure thereto; a compound valve in said conduit consisting of a valve casing provided with an apertured partition dividing the same into inlet and outlet chambers and forming a valve seat, a reciprocating main valve adapted to coöperate with said seat and a supplementary spring actuated valve operable by the main valve stem to control a vent opening leading from the outer chamber of said valve casing.

6. In a humidifying system, a water vaporizing instrumentality having means including a conduit for supplying a gaseous fluid under pressure thereto; a compound valve in said conduit comprising a main valve casing having an apertured partition dividing the same into inlet and outlet chambers and provided with a valve seat, a chambered valve stem casing connected to said main valve casing and communicating with the outlet thereof, a hollow ventilated valve stem reciprocably mounted in said valve casing and provided with a head adapted to coöperate with said valve seat, a supplementary spring actuated valve connected to said valve stem and adapted to be seated upon the head of said valve casing when the main valve is open and to be removed therefrom when the main valve is closed whereby the air in the outlet chamber will be released through said valve stem.

7. In a humidifying system, a water vaporizing instrumentality having means including a conduit for supplying a gaseous fluid under pressure thereto; a compound valve in said conduit comprising a main valve casing having an apertured partition dividing the same into inlet and outlet chambers and provided with a valve seat, a chamber valve stem casing detachably connected to said main valve casing and communicating with the outlet chamber thereof, a hollow vented valve stem reciprocably mounted in said casing and provided with a head adapted to coöperate with said valve seat, a cylindrical spring actuated valve surrounding said valve stem and connected thereto and adapted to be seated upon the head of said valve casing when the main valve is open and to be removed therefrom when the main valve is closed whereby the air in the outer chamber of said valve casing will be vented through said valve stem.

8. In a humidifying system, a water vaporizing instrumentality having means including a conduit for supplying a gaseous fluid under pressure thereto; a compound valve in said conduit comprising a main valve casing having an apertured partition dividing the same into inlet and outlet chambers and provided with a valve seat, a chamber valve stem casing detachably connected to said main valve casing and communicating with the outlet chamber thereof, a hollow vented valve stem reciprocably mounted in said casing and provided with a head adapted to coöperate with said valve seat, a cylindrical spring actuated valve surrounding said valve stem and connected thereto and adapted to be seated upon the head of said valve casing when the main valve is open and to be removed therefrom when the main valve is closed whereby the air in the outer chamber of said valve casing will be vented through said valve stem, a motor adapted to actuate said valve stem in one direction and a spring to actuate the same in the opposite direction.

In testimony whereoof, we have signed our names to this specification.

ALBERT W. THOMPSON.
EDWARD W. COMFORT.